United States Patent
Sun et al.

(10) Patent No.: US 11,492,450 B2
(45) Date of Patent: Nov. 8, 2022

(54) DUAL-HEADED ORGANOALUMINUM COMPOSITIONS

(71) Applicant: Dow Global Technologies LLC, Midland, MI (US)

(72) Inventors: Lixin Sun, Sugar Land, TX (US); Endre Szuromi, Richwood, TX (US); Jerzy Klosin, Midland, MI (US); Edmund M. Carnahan, Pearland, TX (US); Jasson T. Patton, Midland, MI (US); Longyan Liao, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/959,061

(22) PCT Filed: Dec. 27, 2018

(86) PCT No.: PCT/US2018/067665
§ 371 (c)(1),
(2) Date: Jun. 29, 2020

(87) PCT Pub. No.: WO2019/133705
PCT Pub. Date: Jul. 4, 2019

(65) Prior Publication Data
US 2020/0339760 A1    Oct. 29, 2020

Related U.S. Application Data

(60) Provisional application No. 62/611,680, filed on Dec. 29, 2017.

(51) Int. Cl.
*C08G 79/10*    (2006.01)
*C08F 2/38*     (2006.01)
*C08F 10/00*    (2006.01)

(52) U.S. Cl.
CPC ............... *C08G 79/10* (2013.01); *C08F 2/38* (2013.01); *C08F 10/00* (2013.01)

(58) Field of Classification Search
CPC ............. C08G 79/10; C08F 2/38; C08F 10/00
(Continued)

(56) References Cited

U.S. PATENT DOCUMENTS 3,149,136 A    9/1964  Bruce, Jr. et al.
5,648,310 A    7/1997  Wasserman et al.
(Continued)

FOREIGN PATENT DOCUMENTS

GB    887313        1/1962
WO    2005090426    9/2005
(Continued)

OTHER PUBLICATIONS

D'yakonov et al., (Russian Journal of Organic Chemistry, 2010, vol. 46, No. 6, pp. 807-811) published in Zhurnal Organicheskoi Khimii, 2010, vol. 46, No. 6, pp. 816-819.*
(Continued)

*Primary Examiner* — Robert S Jones, Jr.
*Assistant Examiner* — Jiangtian Xu (57) ABSTRACT

The present disclosure relates to dual-headed organoaluminum compositions having the formula (I) and processes to prepare the same. In at least one aspect, the compositions having the formula (I) may be used during olefin polymerization.

9 Claims, 5 Drawing Sheets

(58) Field of Classification Search
USPC .......................................................... 526/185
See application file for complete search history.

(56) References Cited

U.S. PATENT DOCUMENTS

| | | |
|---|---|---|
| 5,672,669 A | 9/1997 | Wasserman et al. |
| 5,783,512 A | 7/1998 | Jacobsen et al. |
| 5,977,251 A | 11/1999 | Kao et al. |
| 6,319,989 B1 | 11/2001 | Anderson et al. |
| 6,683,149 B2 | 1/2004 | Jain et al. |
| 7,355,089 B2 | 4/2008 | Chang et al. |
| 7,897,698 B2 | 3/2011 | Johannsen et al. |
| 7,947,793 B2 | 5/2011 | Marchand et al. |
| 8,058,373 B2 | 11/2011 | Stevens et al. |
| 8,293,859 B2 | 10/2012 | Marchand et al. |
| 8,476,366 B2 | 7/2013 | Walton et al. |
| 8,501,885 B2 | 8/2013 | Arriola et al. |
| 8,563,658 B2 | 10/2013 | Walton et al. |
| 8,686,087 B2 | 4/2014 | Li Pi Shan et al. |
| 8,716,400 B2 | 5/2014 | Carnahan et al. |
| 8,785,554 B2 | 7/2014 | Li Pi Shan et al. |
| 8,791,284 B2 | 7/2014 | Ochiai et al. |
| 8,822,598 B2 | 9/2014 | Li Pi Shan et al. |
| 8,822,599 B2 | 9/2014 | Li Pi Shan et al. |
| 9,321,854 B2 | 4/2016 | Holtcamp et al. |
| 2006/0199930 A1 | 9/2006 | Li Pi Shan et al. |
| 2007/0167578 A1 | 7/2007 | Arriola et al. |
| 2008/0311812 A1 | 12/2008 | Arriola et al. |
| 2011/0028657 A1 | 2/2011 | Clark et al. |
| 2018/0265602 A1 | 9/2018 | Sun et al. |
| 2020/0332045 A1 | 10/2020 | Sun et al. |

FOREIGN PATENT DOCUMENTS

| | | |
|---|---|---|
| WO | 2005090427 A2 | 9/2005 |
| WO | 2007035485 | 3/2007 |
| WO | 2009012215 | 1/2009 |
| WO | 2014105411 | 7/2014 |
| WO | 2016028957 | 2/2016 |
| WO | 2016028970 | 2/2016 |
| WO | 2018/064540 A1 | 4/2018 |
| WO | 2018/064546 A1 | 4/2018 |
| WO | 2018064553 | 4/2018 |
| WO | WO 2018/064553 A1 * | 4/2018 |

OTHER PUBLICATIONS

Eyrisch, "Ethenolysis of functionalized cycloolefins," Monomers and Polymers, 2004, p. 661-676, vol. 7.

Freijee, "The synthesis and structure of zinccacyclopentane, zincacylcophexane, and zincacycloheptane," Organomet Chem., 1982, p. 217-221, vol. 224.

Makio, "Synthesis of Telechelic Olefin Polymers via Cataylyzed Chain Growth on Multinuclear Alkylene Zinc Compounds," Chem. Soc., 2013, p. 8177-8180, vol. 135.

Prasad, "The preparation of 1,3-dizincapropanes via a boron-zinc transmetallation," Organomet, Chem., 1998, p. 133-139, vol. 562.

Rudin, "Modern Methods of Polymer Characterization," Polymer Handbook., 1991, p. 103-112, John Wiley & Sons, New York.

Williams, "The construction of a polyethylene calibration curve for gel permeation chromatography using polystyrene fractions," Polym. Sci., Polym. Let,1968, p. 621, vol. 6.

PCT/US2018/067665, International Search Report and Written Opinion dated Mar. 29, 2019.

PCT/US2018/067665, International Preliminary Report on Patentability dated Jul. 9, 2020.

* cited by examiner

DUAL-HEADED ORGANOALUMINUM COMPOSITIONS

CROSS-REFERENCE TO RELATED APPLICATIONS

This is the U.S. National Stage of International Application No. PCT/US2018/067665, filed Dec. 27, 2018, which claims priority to, and the benefit of U.S. Provisional Application No. 62/611,680, filed on Dec. 29, 2017, and incorporated herein in its entirety.

FIELD

Embodiments relate to dual-headed organoaluminum compositions and processes to prepare the same. Such compositions may be capable of chain shuttling and/or chain transfer. In at least one aspect, the dual-headed organoaluminum compositions can be used in olefin polymerization.

BACKGROUND

In recent years, advances in polymer design have been seen with the use of compositions capable of chain shuttling, i.e., chain shuttling agents (CSAs). For example, chain shuttling agents having reversible chain transfer ability with transition metal catalysts have enabled the production of novel olefin block copolymers (OBCs). Currently, the best known compositions capable of chain shuttling are simple metal alkyls that typically contain only a single point of attachment to the metal for each polymer chain, such as diethyl zinc which produces polymer chains terminated with zinc metal at one end. More sophisticated compositions capable of chain shuttling, such as dual-headed chain shuttling agents, with the alkane moiety attached to two metals, are also known. Indeed, dual-headed compositions capable of chain shuttling are of great interest since they can enable the production of new polyolefins, such as telechelic functional polymers, triblock copolymers, etc.

SUMMARY

In certain embodiments, this disclosure relates to a dual-headed organoaluminum composition of formula (I):

(I)

wherein:
n is a number from 1 to 100;
Y is a linking group composed of a linear, branched, or cyclic $C_4$ to $C_{100}$ hydrocarbylene group that optionally includes at least one heteroatom and that is aliphatic or aromatic, wherein Y comprises two points of attachments to Al atoms and at least one of the two points of attachments is —$CH_2$—;
each J group is independently hydrogen or a substituted or unsubstituted acyclic alkyl group; and
two J groups attached to the same Al atom can be optionally covalently linked together.

In further embodiments, this disclosure relates to a process for preparing a dual-headed organoaluminum composition of formula (I), the process comprising: (a) combining an aluminum compound, a linking agent, and an optional solvent at a temperature of from 25° C. to 200° C., and (b) obtaining the composition of formula (I), wherein the aluminum compound has the formula $Al(J)_3$, wherein each J is independently hydrogen or a substituted or unsubstituted acyclic alkyl group, and, optionally, two J groups can be covalently linked together; and the linking agent is a $C_4$ to $C_{100}$ hydrocarbon comprising either at least two vinyl groups or a vinyl group and a cyclic olefin group and, optionally, includes at least one heteroatom.

In further embodiments, this disclosure relates to a dual-headed organoaluminum composition of formula (I) comprising the reaction product of: an aluminum compound, a linking agent, and an optional solvent, wherein the aluminum compound has the formula $Al(J)_3$, wherein each J group is independently hydrogen or a substituted or unsubstituted acyclic alkyl group, and, optionally, two J groups can be covalently linked together; and the linking agent is a $C_4$ to $C_{100}$ hydrocarbon comprising either at least two vinyl groups or a vinyl group and a cyclic olefin group and, optionally, includes at least one heteroatom.

DEFINITIONS

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date of this disclosure. For purposes of United States patent practice, the contents of any referenced patent, patent application or publication are incorporated by reference in their entirety (or its equivalent U.S. version is so incorporated by reference in its entirety), especially with respect to the disclosure of synthetic techniques, product and processing designs, polymers, catalysts, definitions (to the extent not inconsistent with any definitions specifically provided in this disclosure), and general knowledge in the art.

Number ranges in this disclosure are approximate and, thus, may include values outside of the ranges unless otherwise indicated. The numerical ranges disclosed herein include all values from, and including, the lower and upper value. For ranges containing explicit values (e.g., 1, or 2, or 3 to 5, or 6, or 7), any subrange between any two explicit values is included (e.g., 1 to 2; 2 to 6; 5 to 7; 3 to 7; 5 to 6; etc.). The numerical ranges disclosed herein further include the fractions between any two explicit values.

In the event the name of a compound herein does not conform to the structural representation thereof, the structural representation shall control.

The terms "chain shuttling agent" and "chain transfer agent" refer to those known to one of ordinary skill in the art. Specifically, the term "shuttling agent" or "chain shuttling agent" refers to a compound or mixture of compounds that is capable of causing polymeryl transfer between various active catalyst sites under conditions of polymerization. That is, transfer of a polymer fragment occurs both to and from an active catalyst site in a facile and reversible manner. In contrast to a shuttling agent or chain shuttling agent, an agent that acts merely as a "chain transfer agent," such as some main-group alkyl compounds, may exchange, for example, an alkyl group on the chain transfer agent with the growing polymer chain on the catalyst, which generally results in termination of the polymer chain growth. In this event, the main-group center may act as a repository for a dead polymer chain, rather than engaging in reversible transfer with a catalyst site in the manner in which a chain shuttling agent does. Desirably, the intermediate formed between the chain shuttling agent and the polymeryl chain is not sufficiently stable relative to exchange between this intermediate and any other growing polymeryl chain, such that chain termination is relatively rare.

The term "derivative" used herein refers to the reaction product of a chemical species after the insertion reaction of said chemical species into metal alkyl or metal hydride bonds. For example, and without limitation, the "$Y^C$" in $(R)_2$—Al[—$Y^C$—Al(R)]$_n$—(R) can define the derivative of the linking agent $CH_2$=CH$(CH_2)_6$CH=$CH_2$ when said linking agent is reacted with $(iBu)_2$AlH to form $(iBu)_2$-Al[—$CH_2(CH_2)_8CH_2$—Al(iBu)]$_n$iBu. In this non-limiting example, $Y^C$ is —$CH_2(CH_2)_8CH_2$—, a linking group which is the derivative of the linking agent $CH_2$=CH$(CH_2)_6$CH=$CH_2$ after insertion of said linking agent into Al—H bonds.

The term "linking agent" is a chemical species whose derivative links multiple metal species together in a molecule by inserting into a metal hydride bond of each metal. In the above non-limiting example, $CH_2$=CH$(CH_2)_6$CH=CH is a "linking agent" which joins n+1 aluminum species to form the species $(iBu)_2$Al[—$CH_2(CH_2)_8CH_2$—Al(iBu)]$_n$iBu. After insertion, the linking agent becomes the linking group —$CH_2(CH_2)_8CH_2$—.

"Co-catalysts" refers to compounds that can activate a procatalyst to form an active catalyst composition/system capable of polymerization of unsaturated monomers. "Co-catalyst" is used interchangeably with "activator" and like terms.

"Procatalyst" refers to a transition metal compound that, when combined with an activator, is capable of polymerization of unsaturated monomers. Suitable procatalysts for the present disclosure include those that either require or do not require a co-catalyst to become an active catalyst capable of polymerizing unsaturated monomers. "Procatalyst" is used interchangeably with "catalyst precursor," "transition metal catalyst," "transition metal catalyst precursor," "metal complex," and like terms. Suitable procatalysts include those known in the art, such as those disclosed in WO 2005/090426, WO 2005/090427, WO 2007/035485, WO 2009/012215, WO 2014/105411, U.S. Patent Publication Nos. 2006/0199930, 2007/0167578, 2008/0311812, and U.S. Pat. Nos. 7,355,089 B2, 8,058,373 B2, and 8,785,554 B2, all of which are incorporated herein by reference in their entirety.

"Catalyst system" refers to a procatalyst or the combination of a procatalyst and an activator, with or without a support, capable of olefin polymerization. "Catalyst system" is used interchangeably with "active catalyst," "active catalyst composition," "olefin polymerization catalyst," and like terms.

"Polymer" refers to a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems.

DETAILED DESCRIPTION

All schemes and discussions below are by way of example only and are not meant to be limiting in any way. As noted herein, dual-headed compositions (e.g., dual-headed CSAs) are of great interest since they can enable production of telechelic functional polymers. For example, and without limitation, reference is made to non-limiting Structure 1. Structure 1 represents an exemplary dual-headed composition with a Y linking group sandwiched between two aluminum atoms. Y may be, for example, a linear, branched, or cyclic $C_4$ to $C_{100}$ hydrocarbylene group that optionally includes at least one heteroatom ((B, O, S, N, F, Cl or Si)) and that is aliphatic or aromatic. The Y linking group links two separate Al atoms and is attached to each Al atom via points of attachment. The points of attachment are groups within (i.e., fragments of) the Y linking group, and at least one point of attachment is an ethylene group, —$CH_2$—. Each of the terminal J groups may be hydrogen or a substituted or unsubstituted acyclic alkyl group. Two J groups attached to the same Al atom can be optionally covalently linked together. The Y linking group can then, during olefin polymerization, grow into a polymer chain with both terminal ends of the chain bonded to the aluminum atoms via terminal polymeryl-metal bonds. Subsequently, the terminal polymeryl-metal bonds may be transformed to desired functional groups via functionalization chemistry, thereby resulting in a desired di-functional (telechelic) polymer chain. The composition of non-limiting Structure 1 may be in monomeric (n=1) or oligomeric (n>1) forms.

Structure 1

Process for Preparing Dual-Headed Organoaluminum Compositions

The composition of formula (I) can be prepared from the reaction resulting from combining an aluminum compound and a linking agent. The reaction can occur in the absence of (neat) or in the presence of solvent(s). Suitable solvents include but are not limited to non-polar solvents, such as xylenes, toluene, hexane, pentane, benzene, or combinations thereof.

Accordingly, the composition of formula (I) can be prepared by a process comprising: (a) combining an aluminum compound, a linking agent, and an optional solvent, and (b) obtaining the composition of formula (I), wherein: the aluminum compound has the formula $Al(J)_3$, where each J group is independently hydrogen or a substituted or unsubstituted acyclic alkyl group, and, optionally, two J groups can be covalently linked together; and the linking agent is a $C_4$ to $C_{100}$ hydrocarbon comprising either at least two vinyl groups or a vinyl group and a cyclic olefin group and, optionally, includes at least one heteroatom.

The reaction resulting from combining an aluminum compound, a linking group, and an optional solvent may be conducted at a temperature of from 25° C. to 200° C., or from 80° C. to 180° C., or from 100° C. to 150° C. The elevated temperatures facilitate the removal of the J groups (e.g., alkyl groups) of the aluminum compound via beta-hydride elimination resulting in insertion of the linking agent into Al—H to form the composition of formula (I).

Accordingly, in certain embodiments, the composition of formula (I) can be prepared by a process comprising: (a) combining an aluminum compound, a linking agent, and an optional solvent at a temperature of from 25° C. to 200° C. (or from 80° C. to 180° C. or from 100° C. to 150° C.), and (b) obtaining the composition of formula (I), wherein: the aluminum compound has the formula $Al(J)_3$, where each J group is independently hydrogen or a substituted or unsubstituted acyclic alkyl group, and, optionally, two J groups can be covalently linked together; and the linking agent is a $C_4$ to $C_{100}$ hydrocarbon comprising either at least two vinyl groups or a vinyl group and a cyclic olefin group and, optionally, includes at least one heteroatom.

The reaction resulting from combining an aluminum compound, a linking agent, and an optional solvent may require a reaction period of from 30 minutes to 200 hours depending on the temperature at which the reaction is conducted. For example, and without limitation, a reaction period of 1 to 2 hours may be needed if the reaction is conducted at 150° C., a reaction period of 2 to 5 hours may be needed if the reaction is conducted at 120° C., and a reaction period of 20 to 200 hours may be needed if the reaction is conducted at 60° C.

Accordingly, in certain embodiments, the composition of formula (I) can be prepared by a process comprising: (a) combining an aluminum compound, a linking agent, and an optional solvent at a temperature of from 25° C. to 200° C. (or from 80° C. to 180° C. or from 100° C. to 150° C.) for a period of from 30 minutes to 200 hours (or from 30 minutes to 100 hours, or from 1 hour to 50 hours, or from 1 hour to 30 hours, or from 1 hour to 25 hours, or from 1 hour to 15 hours, or from 1 hour to 10 hours, or from 1 hour to 5 hours), and (b) obtaining the composition of formula (I), wherein: the aluminum compound has the formula $Al(J)_3$, where each J group is independently hydrogen or a substituted or unsubstituted acyclic alkyl group, and, optionally, two J groups can be covalently linked together; and the linking agent is a $C_4$ to $C_{100}$ hydrocarbon comprising either at least two vinyl groups or a vinyl group and a cyclic olefin group and, optionally, includes at least one heteroatom.

In certain embodiments of the process of the present disclosure, the linking agent:aluminum compound ratio is defined as n:(n+1), where n may be a number from 1 to 10.

Aluminum Compound

Aluminum compounds are defined herein as compounds with the formula $Al(J)_3$, where each J group independently is hydrogen or a substituted or unsubstituted acyclic alkyl group, wherein at least one J group is hydrogen or an acyclic alkyl group, and, optionally, two J groups can be covalently linked together. Optionally, one J group, or each of two or three J groups, can be a hydrogen atom. In certain embodiments, one J group, or each of two or three J groups, is an acyclic alkyl group containing 1 to 30 carbon atoms or 2 to 20 carbon atoms. In certain embodiments, one J group, or each of two or three J groups, is not hydrogen. In further embodiments, one J group, or each of two or three J groups, is not methyl. In further embodiments, one J group, or each of two or three J groups, is a $C_1$ to $C_{30}$ acyclic alkyl group or a $C_2$ to $C_{20}$ acyclic alkyl group. In certain embodiments, one J group, or each of two or three J groups, is a branched $C_3$ to $C_{30}$ acyclic alkyl group. In further embodiments, two J groups can be covalently linked together.

Suitable J groups include but are not limited to methyl, ethyl, propyl, butyl, isobutyl, pentyl, hexyl, heptyl, octyl, nonyl, decyl, undecyl, docecyl, and all isomers thereof. Trialkylaluminum compounds and dialkylaluminum hydride compounds are suitable reagents. Useful trialkylaluminum compounds include but are not limited to trimethyl aluminum, triethyl aluminum, triisobutyl aluminum, tripropyl aluminum, tributyl aluminum, trihexyl aluminum, triisohexyl aluminum, trioctyl aluminum, triisooctyl aluminum, tripentyl aluminum, tridecyl aluminum, and the like. Useful dialkylaluminum-hydride compounds include but are not limited to dimethylaluminum-hydride, diethylaluminum-hydride, diisobutylaluminum-hydride, dibutylaluminum-hydride, dipropylaluminum-hydride, dihexylaluminum-hydride, diisohexylaluminum-hydride, dioctylaluminum-hydride, diisooctylaluminum-hydride, dipentylaluminum-hydride, didecylaluminum-hydride, and the like.

Linking Group

In the composition of formula (I), Y is a linking group, which is a linear, branched, or cyclic $C_4$ to $C_{100}$ hydrocarbylene group that optionally includes at least one heteroatom and that is aliphatic or aromatic. Linking group Y is the derivative of a linking agent, wherein the linking agent is a $C_4$ to $C_{100}$ hydrocarbon comprising either at least two vinyl groups or a vinyl group and a cyclic olefin group and, optionally, includes at least one heteroatom. Suitable linking agents must be able to insert into aluminum-hydride bonds such that derivatives of the linking agents are sandwiched between two aluminum atoms. As discussed above, Y of the composition of formula (I) is a linking group that can transfer to an active catalyst and grow during olefin polymerization into a polymer chain as a result of chain transfer/chain shuttling between the active catalyst and the aluminum species to form a precursor for a telechelic polymer. Subsequent functionalization will then result in formation of the telechelic polymer.

In certain embodiments, Y is the derivative of a diene. In other words, the linking agent is a diene. As used herein, the term diene refers to any compound that contains either two vinyl groups or a vinyl group and a cyclic olefin group and, optionally, includes at least one heteroatom. Examples of suitable dienes include hydrocarbon-based dienes, heteroatom-containing hydrocarbon-based dienes such as 1,3-di(ω- alkenyl)-tetramethyldisiloxanes and di(ω-alkenyl)ethers and dienes containing aromatic fragments, such as divinylbenzene.

Suitable hydrocarbon-based dienes as referred to herein include but are not limited to dienes having the formula $CH_2=CH(CH_2)_mCH=CH_2$ or $CH_2=CH(Ar)_mCH=CH_2$, including cyclic and bicyclic analogs thereof, where m is an integer from 0 to 20, and Ar is an aryl group. Examples of these hydrocarbon-based dienes include but are not limited to 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like, typically containing from 5 to 40 carbon atoms.

Heteroatom-containing hydrocarbon-based dienes as referred to herein include dienes which contain at least one B, O, S, N, F, Cl or Si atom, or a combination of atoms. Specific examples of heteroatom-containing hydrocarbon-based dienes include but are not limited to compounds having the formulas $O[(CH_2)_mCH=CH_2]_2$, $S[(CH_2)_mCH=CH_2]_2$, $R^AN[(CH_2)_mCH=CH_2]_2$, $(R^B)_2Si[(CH_2)_mCH=CH_2]_2$, $Ar[Si(R^B)_2(CH_2)_mCH=CH_2]_2$, $(CH_2)_m[Si(R^B)_2(CH_2)_mCH=CH_2]_2$, $(R^B)_3SiOSiR^B[(CH_2)_mCH=CH_2]_2$, and $[Si(R^B)_2(CH_2)_mCH=CH_2]_2O$; wherein m in each occurrence is independently an integer from 0 to 20, inclusive, preferably 1 to 20 inclusive; $R^A$ is H or a hydrocarbyl having from 1 to 12 carbon atoms, inclusive; $R^B$ in each occurrence is independently a hydrocarbyl having from 1 to 12 carbon atoms, inclusive; and Ar is an aryl group.

Examples of heteroatom-containing hydrocarbon-based dienes include but are not limited to divinyldiphenylsilane, 1,4-bis(dimethyl(vinyl)silyl)benzene, 1,5-bis(dimethyl(vinyl)silyl)pentane, divinyl ether, di(2-propenyl)ether, di(3-butenyl)ether, di(4-pentenyl)ether, di(5-hexenyl)ether, divinyl amine, di(2-propenyl)amine, di(3-butenyl)amine, di(4-pentenyl) amine, di(5-hexenyl)amine, divinyl methylamine, di(2-propenyl)methylamine, di(3-butenyl)methylamine, di(4-pentenyl)methylamine, di(5-hexenyl)methylamine, divinyl thioether, di(2-propenyl)thioether), di(3-butenyl) thioether, di(4-pentenyl)thioether, di(5-hexenyl)thioether, divinyl dimethylsilane, di(2-propenyl) dimethylsilane, di(3-butenyl) dimethylsilane, di(4-pentenyl) dimethylsilane, di(5-hexenyl) dimethylsilane, and the like, typically containing from 4 to 40 carbon atoms.

Further examples of suitable heteroatom containing hydrocarbon-based dienes include but are not limited to the disiloxane compounds, such as the 1,1- and the 1,3-isomers of divinyl tetramethyldisiloxane (also referred to here as di(ethan-1,2-diyl) tetramethyldisiloxane), di(2-propenyl)tetramethyldisiloxane, di(3-butenyl)tetramethyldisiloxane, di(4-pentenyl)tetramethyldisiloxane, di(5-hexenyl)tetramethyldisiloxane, di(6-heptenyl)tetramethyldisiloxane, di(7-octenyl)tetramethyldisiloxane, di(8-nonenyl)tetramethyldisiloxane, di(9-decenyl)-tetramethyldisiloxane, divinyltetraethyldisiloxane, di(2-propenyl)tetraethyldisiloxane, di(3-butenyl)tetraethyldisiloxane, di(4-pentenyl)tetraethyldisiloxane, di(5-hexenyl)-tetraethyldisiloxane, di(6-heptenyl)tetraethyldisiloxane, di(7-octenyl) tetraethyldisiloxane, di(8-nonenyl)tetraethyldisiloxane, di(9-decenyl)tetraethyldisiloxane, and the like;

diene compounds containing one cyclic olefin or cyclic alkane such as vinyl norbornene, 1,3-divinylcyclopentane, and vinylcyclohexene;

halogen-containing diene compounds such as 3-chloro-1,4-pentadiene, 3-bromo-3-methyl-1,4-pentadiene, 3-chloro-1,4-hexadiene, 3-chloro-3-methyl-1,4-hexadiene, 3-bromo-4-methyl-1,4-hexadiene, 3-chloro-5-methyl-1,4-hexadiene, 3-bromo-4,5-dimethyl-1,4-hexadiene, 3-bromo-1,5-hexadiene, 3-chloro-3-methyl-1,5-hexadiene, 3-bromo-1,5-heptadiene, 3-chloro-3-methyl-1,5-heptadiene, 4-bromo-1,6-heptadiene, 3-chloro-4-methyl-1,6-heptadiene, 4-bromo-1,6-octadiene, 3-chloro-4-methyl-1,6-octadiene, 4-bromo-7-methyl-1,6-octadiene, 4-chloro-1,7-octadiene, 3-chloro-4-methyl-1,7-octadiene, 4-bromo-1,7-nonadiene, 4-bromo-4-methyl-1,7-nonadiene, 4-bromo-1,8-nonadiene, 3-chloro-4-methyl 1,8-nonadiene, 5-bromo-1,8-decadiene, 3-chloro-5-methyl-1,8-decadiene, 5-bromo-1,9-decadiene, 3-chloro-5-methyl-1,9-decadiene, 5-bromo-1,10-undecadiene, and 5-bromo-1,1'-dodecadiene;

silane-containing dienes such as bis(vinyloxy)silane, dimethyl bis(vinyloxy)silane, bisallyloxy silane, dimethylbis(allyloxy)silane, di(3-butenyl)dimethyl silane, bis(3-butenyloxy)silane, dimethylbis(3-butenyloxy)silane, di(4-pentenyl)dimethyl silane, bis(4-pentenyloxy)silane, bis(4-pentenyloxy)dimethylsilane, di(5-hexenyl)dimethylsilane, bis(5-hexenyloxy)silane, and bis(5-hexenyloxy)dimethylsilane;

ester-containing diene compounds such as 3-butenyl-4-pentenoate, 4-pentenyl-4-pentenoate, 4-methoxycarbonyl-1,7-octadiene, and 4-methoxycarbonyl-1,9-decadiene;

ether-containing diene compounds such as divinyl ether, diallyl ether, di(4-butenyloxy)ether, and di(5-hexenyloxy) ether; and siloxy-containing diene compounds such as 4-trimethyl siloxymethyl-1,7-octadiene, and 4-trimethyl siloxymethyl-1,9-decadiene.

In further embodiments, Y is the derivative of conjugated diene compounds such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, and 2-phenyl-1,3-butadiene.

In further embodiments, Y is the derivative of a triene or a $C_4$ to $C_{100}$ hydrocarbon comprising three or more vinyl groups and optionally includes at least one heteroatom. In other words, the linking agent is a triene or a $C_4$ to $C_{100}$ hydrocarbon comprising three or more vinyl groups and optionally includes at least one heteroatom. Suitable examples include but are not limited to 1,4,7-octatriene, 3-methyl-1,4,7-octatriene, 1,5,9-decatriene, 4-methyl-1,5,9-decatriene, 1,2,4-trivinylcyclohexane, and the like. In certain embodiments, the linking agent is 1,2,4-trivinylcyclohexane resulting in a composition of formula (I) having the following structural formulae with J as defined herein:

All linking groups discussed herein are generally available or can be produced by known methods.

Polymerization Process

In certain embodiments, the composition of formula (I) can function as a chain shuttling agent or a chain transfer agent during an olefin polymerization process.

Accordingly, the present disclosure relates to a polymerization process for the polymerization of at least one addition polymerizable monomer (i.e., olefin monomer) to form a polymer composition, the process comprising: contacting at least one addition polymerizable monomer (olefin monomer) with a catalyst composition under polymerization conditions; wherein the catalyst composition comprises the contact product (reaction product) of at least one catalyst precursor, an optional co-catalyst, and the composition of formula (I).

The dual-headed organoaluminum compositions of formula (I) and catalyst systems using the compositions of formula (I) described herein are suitable for use in any prepolymerization and/or polymerization process over a wide range of temperatures and pressures. Such temperatures and pressures, as well as other polymerization process information, described herein can be referred to as "polymerization conditions." The temperatures may be in the range of from 50° C. to about 280° C., preferably from 50° C. to about 200° C. In another embodiment, the polymerization temperature is above 0° C., above 50° C., above 80° C., above 100° C., above 150° C. or above 200° C. In an embodiment, the pressures employed may be in the range from 1 atmosphere to about 500 atmospheres or higher. Polymerization processes include solution, gas phase, slurry phase and a high pressure process or a combination thereof.

In one embodiment, the present disclosure is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The present disclosure is particularly directed to the polymerization of two or more olefin monomers of ethylene, propylene, 1-butene, 1-pentene, 4-methyl-1-pentene, 1-hexene, 1-octene and 1-decene. Useful monomers include ethylenically unsaturated monomers, diolefins having 4 to 18 carbon atoms, conjugated or nonconjugated dienes, polyenes, vinyl monomers and cyclic olefins. Non-limiting monomers may include norbornene, norbornadiene, isobutylene, isoprene, vinylbenzocyclobutane, styrenes, alkyl substituted styrene, ethylidene norbornene, dicyclopentadiene and cyclopentene. In another embodiment of the polymerization process of the present disclosure, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a solution process. In another embodiment of the process of the present disclosure, ethylene or propylene is polymerized with at least two different comonomers, optionally one of which may be a diene, to form a terpolymer.

In one aspect of this disclosure, there is provided a polymerization process and the resulting polymer, the process comprising polymerizing one or more olefin monomers in the presence of an olefin polymerization catalyst and the composition of formula (I) in a polymerization reactor or zone thereby causing the formation of at least some quantity of a polymer joined with the remnant of the composition of formula (I). Exemplary, non-limiting polymerization processes include those known in the art, those disclosed in U.S. Pat. No. 8,501,885 B2, as well as those known in the art for producing random copolymers. Exemplary, non-limiting polymerization processes include those conducted in a single reactor or two reactors (parallel or series).

In yet another aspect, there is provided a process and the resulting polymer, the process comprising polymerizing one or more olefin monomers in the presence of an olefin polymerization catalyst and the composition of formula (I) in a polymerization reactor or zone thereby causing the formation of at least some quantity of an initial polymer joined with the remnant of the composition of formula (I) within the reactor or zone; discharging the reaction product from the first reactor or zone to a second polymerization reactor or zone operating under polymerization conditions that are distinguishable from those of the first polymerization reactor or zone; transferring at least some of the initial polymer joined with the remnant of the composition of formula (I) to an active catalyst site in the second polymerization reactor or zone by means of at least one remaining shuttling site of the composition of formula (I); and conducting polymerization in the second polymerization reactor or zone so as to form a second polymer segment bonded to some or all of the initial polymer by means of a remnant of the composition of formula (I), the second polymer segment having distinguishable polymer properties from the initial polymer segment.

During the polymerization, the reaction mixture is contacted with the activated catalyst composition according to any suitable polymerization conditions. The process can be generally characterized by use of elevated temperatures and pressures. Hydrogen may be employed as a chain transfer agent for molecular weight control according to known techniques, if desired. As in other similar polymerizations, it is generally desirable that the monomers and solvents employed be of sufficiently high purity that catalyst deactivation or premature chain termination does not occur. Any suitable technique for monomer purification such as devolatilization at reduced pressure, contacting with molecular sieves or high surface area alumina, or a combination of the foregoing processes may be employed.

Supports may be employed in the present methods, especially in slurry or gas-phase polymerizations. Suitable supports include solid, particulated, high surface area, metal oxides, metalloid oxides, or mixtures thereof (interchangeably referred to herein as an inorganic oxide). Examples include, but are not limited to talc, silica, alumina, magnesia, titania, zirconia, $Sn_2O_3$, aluminosilicates, borosilicates, clays, and any combination or mixture thereof. Suitable supports preferably have a surface area as determined by nitrogen porosimetry using the B.E.T. method from 10 to 1000 $m^2$/g, and preferably from 100 to 600 $m^2$/g. The average particle size typically is from 0.1 to 500 μm, preferably from 1 to 200 μm, more preferably 10 to 100 μm.

In one aspect of the present disclosure, the catalyst and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, for example, a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context include those processes in which there are intermittent additions of reactants and removal of products at small regular or irregular intervals, so that, over time, the overall process is substantially continuous. The composition of formula (I) (if used) may be added at any point during the polymerization including in the first reactor or zone, at the exit or slightly before the exit of the first reactor, between the first reactor or zone and any subsequent reactor or zone, or even solely to the second reactor or zone. If there exists any difference in monomers, temperatures, pressures or other polymerization conditions within a reactor or between two or more reactors or zones connected in series, polymer segments of differing composition such as comonomer content, crystallinity, density, tacticity, regio-regularity, or other chemical or physical differences, within the same molecule can be formed in the polymers of this disclosure. In such event, the size of each segment or block is determined by the polymer reaction conditions and typically is a most probable distribution of polymer sizes.

If multiple reactors are employed, each can be independently operated under high pressure, solution, slurry, or gas phase polymerization conditions. In a multiple zone polymerization, all zones operate under the same type of polymerization, such as solution, slurry, or gas phase, but, optionally, at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the co-catalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. For example, typical temperatures in a slurry polymerization are from 30° C., generally from 60° C. up to 115° C., including up to 100° C., depending on the polymer being prepared. Pressures typically range from atmospheric (100 kPa) to 500 psi (3.4 MPa).

In all of the foregoing processes, continuous or substantially continuous polymerization conditions generally are employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired co-catalyst or activator and, optionally, a composition of formula (I) may be combined with the catalyst composition either prior to, simultaneously with, or after combination of the catalyst with the monomers to be polymerized and any additional reaction diluent. Desirably, if present, the composition of formula (I) is added at the same time.

At all times, the individual ingredients as well as any active catalyst composition are protected from oxygen, moisture, and other catalyst poisons. Therefore, the catalyst components, the composition of formula (I), and activated catalysts are prepared and stored in an oxygen and moisture free atmosphere, generally under a dry, inert gas such as nitrogen.

Without limiting in any way the scope of the disclosure, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with co-catalyst and the composition of formula (I) are continuously or intermittently introduced in the reactor liquid phase or any recycled portion thereof at a minimum of one location. The reactor temperature and pressure may be controlled, for example, by adjusting the solvent/monomer ratio or the catalyst addition rate, as well as by use of cooling or heating coils, jackets or both. The polymerization rate can be controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned composition of formula (I), or a chain terminating agent such as hydrogen, as is known in the art.

In one aspect of the disclosure, a second reactor is connected to the discharge of a first reactor, optionally by means of a conduit or other transfer means, such that the reaction mixture prepared in the first reactor is discharged to the second reactor without substantial termination of polymer growth. Between the first and second reactors, a differential in at least one process condition may be established. Generally, for use in formation of a copolymer of two or more monomers, the difference is the presence or absence of one or more comonomers or a difference in comonomer concentration. Additional reactors, each arranged in a manner similar to the second reactor in the series may be provided as well. Further polymerization is ended by contacting the reactor effluent with a catalyst kill agent such as water, steam or an alcohol or with a coupling agent if a coupled reaction product is desired.

The resulting polymer product is recovered by flashing off volatile components of the reaction mixture such as residual monomer(s) or diluent at reduced pressure, and, if necessary, conducting further devolatilization in equipment such as a devolatilizing extruder. In a continuous process the mean residence time of the catalyst and polymer in the reactor generally is from 5 minutes to 8 hours, for example, from 10 minutes to 6 hours.

In a further aspect of this disclosure, alternatively, the foregoing polymerization may be carried out in a plug flow reactor optionally with a monomer, catalyst, the composition of formula (I), temperature or other gradient established between differing zones or regions thereof, further optionally accompanied by separate addition of catalysts and/or the composition of formula (I), and operating under adiabatic or non-adiabatic polymerization conditions.

The use of functionalized derivatives of polymers are also included within the present disclosure. Examples include polymers with Al termini resulting from the composition of formula (I). Because a substantial fraction of the polymeric product exiting the reactor is terminated with metal, further functionalization is relatively easy. The metallated polymer species can be utilized in well-known chemical reactions such as those suitable for other alkyl-aluminum compounds to form amine-, hydroxy-, epoxy-, silane, vinylic, and other functionalized terminated polymer products. Polymers with Al termini can also be functionalized via thermal elimination of mono- and di-unsaturated polymers by heating the Al-terminated polymer to temperatures causing beta-hydride elimination, preferably to 150-250° C. in the presence of sacrificial monomer, such as ethylene, which reacts with the resulting aluminum-hydride species, preventing the eliminated mono- or di-unsaturated polymer from undergoing the reverse reaction (i.e. insertion into the aluminum-hydride species).

Olefin Monomers

Suitable monomers for use in preparing the polymer products of the present disclosure in polymerization processes include any addition polymerizable monomer, generally any olefin or diolefin monomer. Suitable monomers can be linear, branched, acyclic, cyclic, substituted, or unsubstituted. In one aspect, the olefin can be any α-olefin, including, for example, ethylene and at least one different copolymerizable comonomer, propylene and at least one different copolymerizable comonomer having from 4 to 20 carbons, or 4-methyl-1-pentene and at least one different copolymerizable comonomer having from 4 to 20 carbons. Examples of suitable monomers include, but are not limited to, straight-chain or branched α-olefins having from 2 to 30 carbon atoms, from 2 to 20 carbon atoms, or from 2 to 12 carbon atoms. Specific examples of suitable monomers include, but are not limited to, ethylene, propylene, 1-butene, 1-pentene, 3-methyl-1-butene, 1-hexane, 4-methyl-1-pentene, 3-methyl-1-pentene, 1-octene, 1-decene, 1-dodecene, 1-tetradecene, 1-hexadecene, 1-octadecene, and 1-eicosene. Suitable monomers for use in preparing the copolymers disclosed herein also include cycloolefins having from 3 to 30, from 3 to 20 carbon atoms, or from 3 to 12 carbon atoms. Examples of cycloolefins that can be used include, but are not limited to, cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene. Suitable monomers for preparing the copolymers disclosed herein also include di- and poly-olefins having from 3 to 30, from 3 to 20 carbon atoms, or from 3 to 12 carbon atoms. Examples of di- and poly-olefins that can be used include, but are not limited to, butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene. In a further aspect, aromatic vinyl compounds also constitute suitable monomers for preparing the copolymers disclosed here, examples of which include, but are not limited to, mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Further, in one aspect, suitable monomers or mixtures of monomers for use in combination with the composition of formula (I) disclosed here include ethylene; propylene; mixtures of ethylene with one or more monomers selected from propylene, 1-butene, 1-hexene, 4-methyl-1-pentene, 1-octene, and styrene; and mixtures of ethylene, propylene and a conjugated or non-conjugated diene. In this aspect, the copolymer or interpolymer can contain two or more intramolecular regions comprising differing chemical or physical properties, especially regions of differentiated comonomer incorporation, joined in a dimeric, linear, branched or polybranched polymer structure. Such polymers may be prepared by altering the polymerization conditions during a polymerization that includes a composition of formula (I), for example by using two reactors with differing comonomer ratios, multiple catalysts with differing comonomer incorporation abilities, or a combination of such process conditions, and optionally a polyfunctional coupling agent.

Polymer Products

As disclosed herein, the polymer products refer to polymer products, after polymerization that are typically subjected to chemical treatment to consume reactive metal alkyl groups and liberate the polymer products from attachment to transition group or main group metals. This process comprises hydrolysis with water to generate saturated polymer end groups. Alternatively, addition of various organic or inorganic reagents may be added to both consume the metal alkyl groups and generate reactive functional end groups on the polymer chains.

The polymers produced by the processes of the present disclosure can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene, and polypropylene copolymers. Propylene based polymers produced include isotactic polypropylene, atactic polypropylene, and random, block or impact copolymers.

Utilizing the polymerization processes disclosed here, novel polymer compositions, including block copolymers of one or more olefin monomers having the present molecular weight distribution, are readily prepared. Exemplary polymers comprise in polymerized form at least one monomer selected from ethylene, propylene, and 4-methyl-1-pentene. Illustratively, the polymers are interpolymers comprising in polymerized form ethylene, propylene, or 4-methyl-1-pentene and at least one different C2-20 α-olefin comonomer, and optionally one or more additional copolymerizable comonomers. Suitable comonomers are selected from diolefins, cyclic olefins, and cyclic diolefins, halogenated vinyl compounds, vinylidene aromatic compounds, and combinations thereof. Exemplary polymers are interpolymers of ethylene with propylene, 1-butene, 1-hexene or 1-octene. Illustratively, the polymer compositions disclosed here have an ethylene content from 1 to 99 percent, a diene content from 0 to 10 percent, and a styrene and/or C3-8 α-olefin content from 99 to 1 percent, based on the total weight of the polymer. The polymers of the present disclosure may have a weight average molecular weight (Mw) from 500 to 2,500,000 in accordance with conventional GPC methods. Typically, the polymers of the present disclosure have a weight average molecular weight (Mw) from 500 to 250,000 (e.g., from 2,000 to 150,000, from 3,000 to 100,000, from 1,000 to 25,000, from 5,000 to 25,000, etc.) in accordance with conventional GPC methods.

The polymers prepared according to this disclosure can have a melt index, I2, from 0.01 to 2000 g/10 minutes, typically from 0.01 to 1000 g/10 minutes, more typically from 0.01 to 500 g/10 minutes, and especially from 0.01 to 100 g/10 minutes in accordance with ASTM D-792, Method B. Desirably, the disclosed polymers can have molecular weights, Mw, from 1,000 g/mol to 5,000,000 g/mol, typically from 1000 g/mol to 1,000,000 g/mol, more typically from 1000 g/mol to 500,000 g/mol, and especially from 1,000 g/mol to 300,000 g/mol in accordance with conventional GPC methods.

The density of the polymers of this disclosure can be from 0.80 to 0.99 g/cc and typically, for ethylene containing polymers, from 0.85 g/cc to 0.97 g/cc (e.g., from 0.853 to 0.970 g/cc) in accordance with ASTM D-792, Method B.

The polymers according to this disclosure may be differentiated from conventional, random copolymers, physical blends of polymers, and block copolymers prepared via sequential monomer addition, fluxional catalysts, or by anionic or cationic living polymerization techniques, by, among other things, their narrow molecular weight distributions. In this aspect, for example, the polymer composition prepared according to this disclosure can be characterized by a polydispersity index (PDI) of from 1.5 to 10.0 (e.g, from 2.0 to 8.0, from 2.0 to 6.0, from 2.0 to 5.0, from 2.0 to 4.0, etc.). For example, the polydispersity index (PDI) of the polymer composition can be from 1.5 to 2.8, from 1.5 to 2.5, or from 1.5 to 2.3.

If present, the separate regions or blocks within each polymer are relatively uniform, depending on the uniformity of reactor conditions, and chemically distinct from each other. That is, the comonomer distribution, tacticity, or other property of segments within the polymer are relatively uniform within the same block or segment. However, the average block length can be a narrow distribution, but is not necessarily so. The average block length can also be a most probable distribution.

Illustratively, these interpolymers can be characterized by terminal blocks or segments of polymer having higher tacticity or crystallinity from at least some remaining blocks or segments. Illustratively, the polymer can be a triblock copolymer containing a central polymer block or segment that is relatively amorphous or even elastomeric.

In a still further aspect of this disclosure, there is provided a polymer composition comprising: (1) an organic or inorganic polymer, preferably a homopolymer of ethylene or of propylene and/or a copolymer of ethylene or propylene with one or more copolymerizable comonomers, and (2) a polymer or combination of polymers according to the present disclosure or prepared according to the process disclosed here.

The polymer products include combinations of two or more polymers comprising regions or segments (blocks) of differing chemical composition. In addition, at least one of the constituents of the polymer combination can contain a linking group which is the remnant of the composition of formula (I), causing the polymer to possess certain physical properties.

Various additives may be usefully incorporated into the present compositions in amounts that do not detract from the properties of the resultant composition. These additives include, for example, reinforcing agents, fillers including conductive and non-conductive materials, ignition resistant additives, antioxidants, heat and light stabilizers, colorants, extenders, crosslinkers, blowing agents, plasticizers, flame retardants, anti-drip agents, lubricants, slip additives, anti-blocking aids, anti-degradants, softeners, waxes, pigments, and the like, including combinations thereof.

The resultant polymers may be block interpolymers that can be characterized by an average block index, e.g., as discussed in U.S. Pat. Nos. 7,947,793, 7,897,698, and 8,293,859. The resultant polymers may be block composites that can be characterized by a block composite index, e.g., as discussed in U.S. Pat. Nos. 8,563,658, 8,476,366, 8,686,087, and 8,716,400. The resultant polymers may be crystalline block composites that can be characterized by a crystalline block composite index, e.g., as discussed in U.S. Pat. Nos. 8,785,554, 8,822,598, and 8,822,599. The resultant polymers may be specified block composites that can be characterized by a microstructure index, e.g., as discussed in WO 2016/028957. The resultant polymers may be specified block composites that can be characterized by a modified block composite index, e.g., as discussed in WO 2016/028970.

In certain embodiments, the process for preparing the composition of formula (I) may be combined with functionalization chemistry to develop telechelic polymers. In certain embodiments, the composition of formula (I) can generate and grow telechelic polymer chains with both ends bonded to the composition of formula (I); subsequent transformation of the terminal polymeryl-metal bonds to desired di-end-functional groups may then occur to form the telechelic polymer.

Applications of the combination of the process for preparing the composition of formula (I) of the present disclosure with functionalization chemistry are in no way limited to development of telechelic polymers and the above example. In certain embodiments, the process for preparing the composition of formula (I) of the present disclosure may be combined with, e.g., coordinative chain transfer polymerization, to produce functionalized polyolefins.

The polymers of the present disclosure may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the present disclosure and blends thereof are useful in such forming operations as film, sheet, and fiber extrusion and coextrusion as well as blow molding, injection molding, roto-molding. Films include blown or cast films formed by coextrusion or by lamination useful as shrink film, cling film, stretch film, sealing film or oriented films.

EXAMPLES

Methods $^1$H NMR: $^1$H NMR spectra are recorded on a Bruker AV-400 spectrometer at ambient temperature. $^1$H NMR chemical shifts in benzene-$d_6$ are referenced to 7.16 ppm ($C_6D_5H$) relative to TMS (0.00 ppm).

$^{13}$C NMR: $^{13}$C NMR spectra of polymers are collected using a Bruker 400 MHz spectrometer equipped with a Bruker Dual DUL high-temperature CryoProbe. The polymer samples are prepared by adding approximately 2.6 g of a 50/50 mixture of tetrachloroethane-$d_2$/orthodichlorobenzene containing 0.025M chromium trisacetylacetonate (relaxation agent) to 0.2 g of polymer in a 10 mm NMR tube. The samples are dissolved and homogenized by heating the tube and its contents to 150° C. The data is acquired using 320 scans per data file, with a 7.3 second pulse repetition delay with a sample temperature of 120° C.

GC/MS: Tandem gas chromatography/low resolution mass spectroscopy using electron impact ionization (EI) is performed at 70 eV on an Agilent Technologies 6890N series gas chromatograph equipped with an Agilent Technologies 5975 inert XL mass selective detector and an Agilent Technologies Capillary column (HP1MS, 15 m×0.25 mm, 0.25 micron) with respect to the following:

Programed Method:

Oven Equilibration Time 0.5 min
50° C. for 0 min
then 25 °C/min to 200° C. for 5 min
Run Time 11 min GPC: The gel permeation chromatographic system consists of either a Polymer Laboratories Model PL-210 or a Polymer Laboratories Model PL-220 instrument. The column and carousel compartments are operated at 140° C. Three Polymer (Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000 and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431 (M_{polystyrene})$. Polyethylene equivalent molecular weight calculations are performed using Viscotek TriSEC software Version 3.0.

Molecular Weight: Molecular weights are determined by optical analysis techniques including deconvoluted gel permeation chromatography coupled with a low angle laser light scattering detector (GPC-LALLS) as described by Rudin, A., "Modern Methods of Polymer Characterization", John Wiley & Sons, New York (1991) pp. 103-112.

Materials

Performance of all examples discussed herein is under an inert atmosphere using dry box techniques unless otherwise stated.

The following materials are obtained from Sigma-Aldrich and purified as needed prior to use: diisobutylaluminum hydride (DIBAL-H); triisobutylaluminum (TIBA); 1,2,4-trivinylcyclohexane (TVCH); 1,9-decadiene; 1,7-octadiene; 3-methyl-1,4-pentadiene; p-xylene; $C_6D_6$; toluene; methanol; hexane; benzene; and $D_2O$. 1,3-Divinylcylopentane was prepared according to procedure published in Designed Monomers and Polymers, 2004, 7, 661-676.

Example 1

Figure 1:
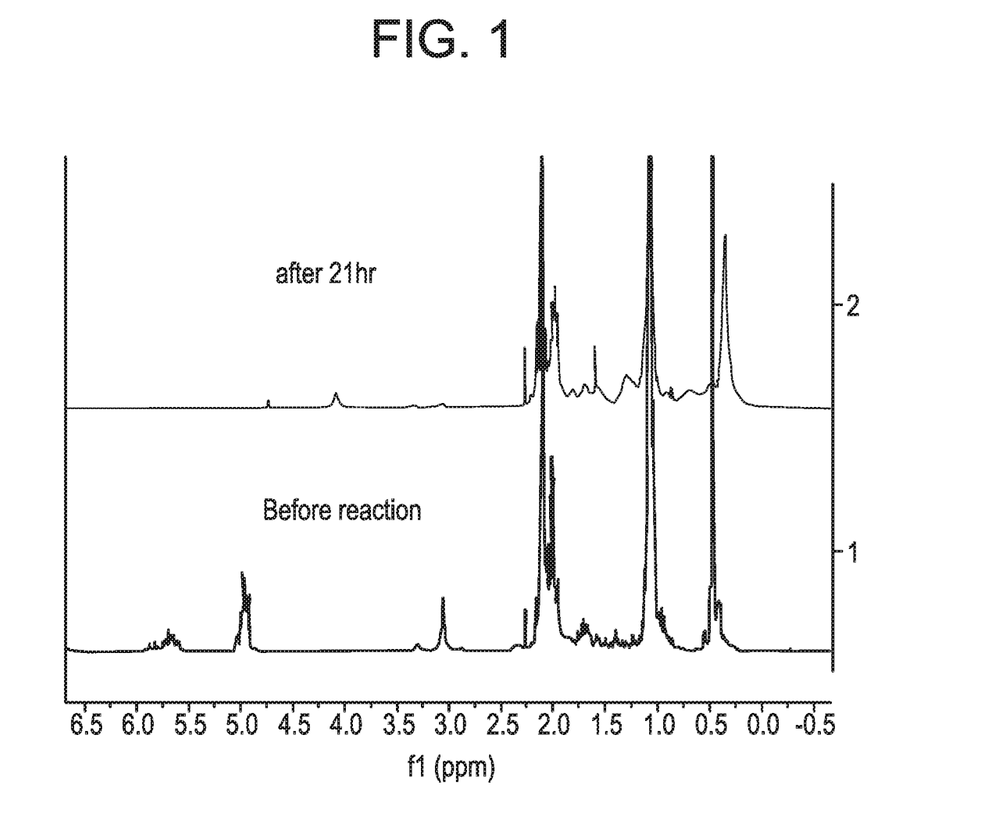
FIG. 1 is the $^1$H NMR spectra for Example 1.
Figure 2A:
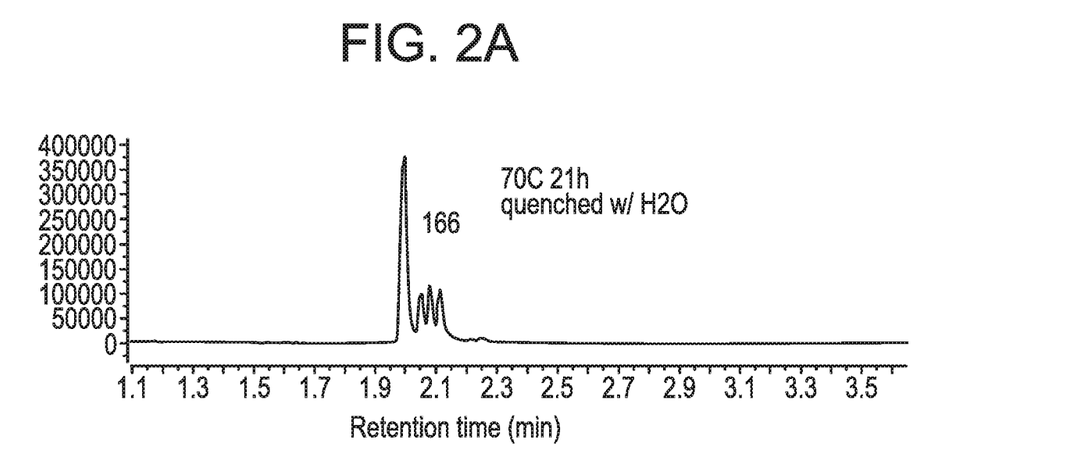
FIGS. 2A and 2B are the GC/MS spectra for Example 1.
Figure 2B:
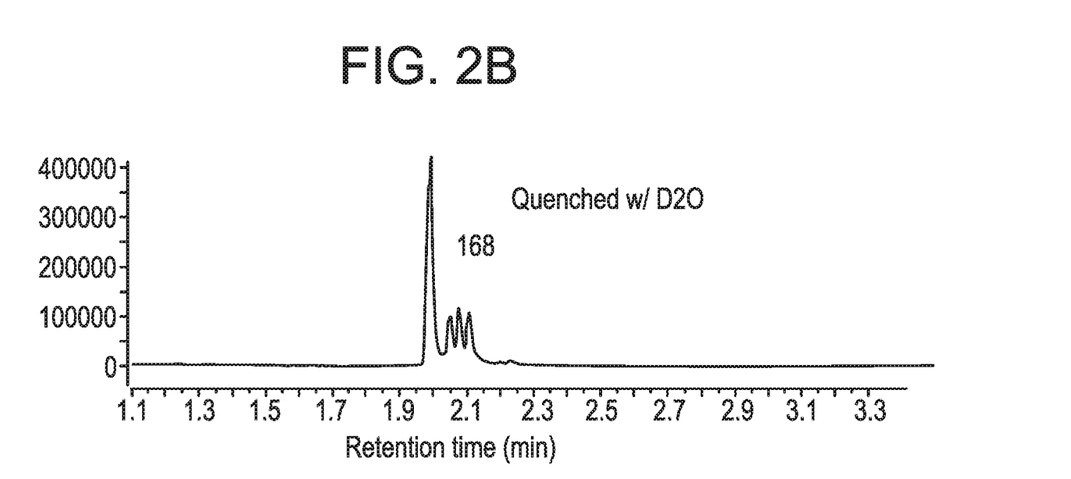
Figure 3:
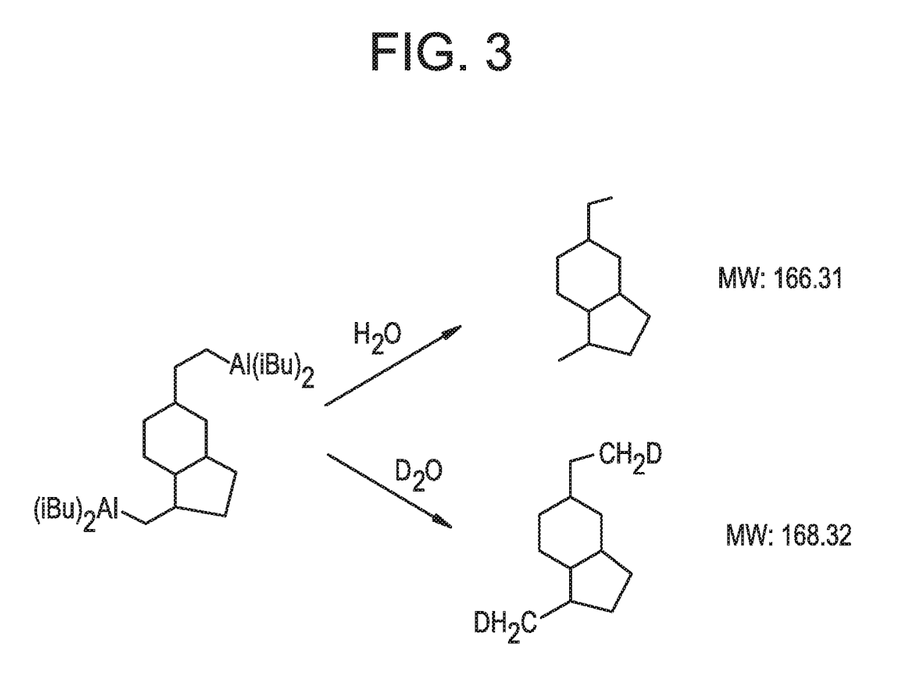
FIG. 3 is the reaction scheme for Example 1.

In a nitrogen-filled drybox, TVCH (0.324 mL, 1.67 mmol) and DIBAL-H (5 mL of 1 M solution in hexane, 5 mmol) are mixed in a capped scintillation vial with a stir-bar. This mixture is heated to and held at 70° C. with stirring for 21 hours, and a small needle is inserted through the septum cap for venting. The reaction proceeds as intended (see non-limiting Reaction Scheme 1) to form the dual-headed organoaluminum composition. To confirm the reaction, a sample (ca 0.1 mL) is mixed with $C_6D_6$ (0.5 mL) for $^1H$ NMR (FIG. 1), which shows that all vinyl groups are consumed. Another sample is quenched with $H_2O$, and the organic phase is analyzed by GC/MS (FIG. 2A), which shows a group of clean peaks at m/z=166. A third sample is quenched with $D_2O$ and analyzed by GC/MS (FIG. 2B), which shows that the peaks moved to m/z=168. The peaks of FIGS. 2A and 2B are consistent with the expected hydrolyzed products of the dual-headed organoaluminum composition shown in FIG. 3. The multiplicity of the peaks is due to the presence of multiple chiral centers in the structure.

Example 2

Figure 4:
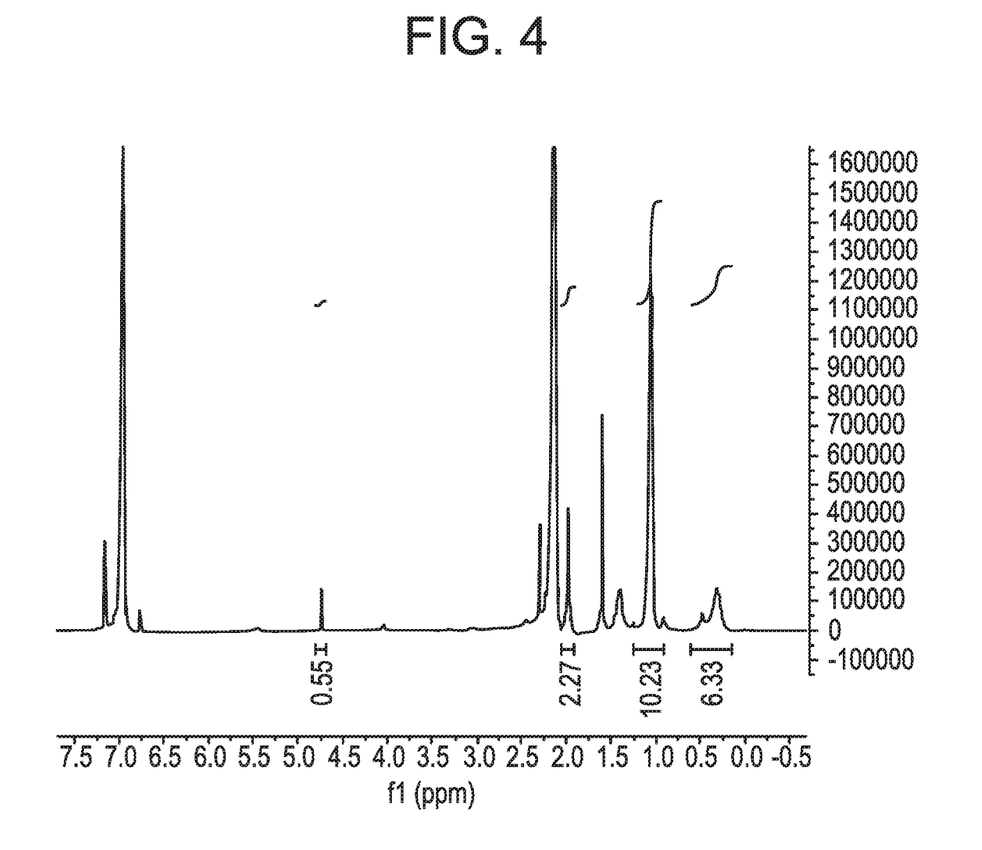
FIG. 4 is the GC/MS spectrum for Example 2.

In a nitrogen-filled drybox, TIBA (1 mL, 3.96 mmol) and 1,9-decadiene (0.55 mL, 2.97 mmol) are mixed in 2 mL of p-xylene in a capped scintillation vial with a stir-bar. This mixture is heated to and held at 130° C. with stirring for two hours, and a small needle is inserted through the septum cap for venting. The reaction proceeds as intended (see non-limiting Reaction Scheme 2) to form the dual-headed organoaluminum composition (the product structure shown in Scheme 2 represents an average composition). To confirm the reaction, a sample is taken and mixed with $C_6D_6$ (0.5 mL) for ¹H NMR, which shows that the vinyl groups of 1,9-decadiene are diminished. As seen in FIG. 4, a sample is also hydrolyzed and analyzed by GC/MS, which shows a clean peak with m/z of 142 that is consistent with the expected hydrolyzed product of the dual-headed organoaluminum composition.

Reaction Scheme 2.

Example 3

In a nitrogen-filled drybox, DIBAL-H (0.5 g, 3.5 mmol) and 1,7-octadiene (0.39 mL, 2.6 mmol) are mixed in 5 mL of p-xylene in a capped scintillation vial with a stir-bar. This mixture is heated to and held at 70° C. with stirring for 3 hours, then heated to and held at 130° C. with stirring for 1 hour; a needle is inserted through the septum cap for venting. The reaction proceeds as intended (see non-limiting Reaction Scheme 3) to form the dual-headed organoaluminum composition (the product structure shown in Scheme 3 represents an average composition). To confirm the reaction, a sample of the mixture is taken for ¹H NMR analysis. ¹H NMR shows that the vinyl groups of 1,7-octadiene are completely consumed. In addition, a sample of the mixture is hydrolyzed and analyzed by GC/MS, which shows a clean peak with m/z of 114 that is consistent with the expected hydrolysis product of the dual-headed organoaluminum composition.

Reaction Scheme 3.

Example 4

Figure 5:
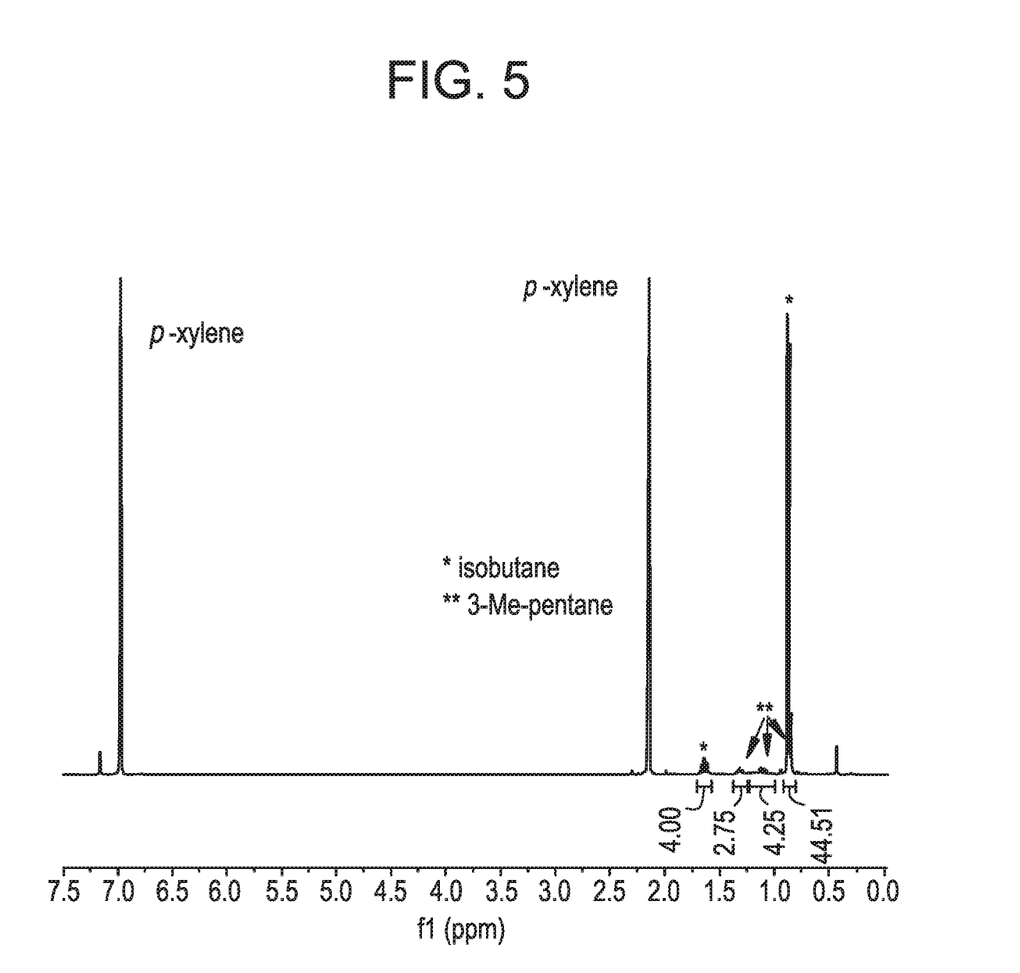
FIG. 5 is the NMR spectrum for Example 4.

In a nitrogen-filled drybox, neat DIBAL-H (4.0 g, 28.13 mmol) and 3-methyl-1,4-pentadiene (1.72 mL, 14.06 mmol, d=0.673) are mixed in 12 mL of p-xylene in a capped scintillation vial with a stir-bar. This mixture is heated to and held at 60° C. with stirring for 14 hours, and a needle is inserted through the septum cap for venting. The reaction proceeds as intended (see non-limiting Reaction Scheme 4) to form the dual-headed organoaluminum composition. To confirm the reaction, an aliquot of the mixture is diluted with C₆D₆, hydrolyzed with water, and analyzed by ¹H NMR (FIG. 5). ¹H NMR shows the expected hydrolysis products, isobutane and 3-methylpentane, of the dual-headed organoaluminum composition. Note: this reaction can also be carried out in toluene or neat.

Reaction Scheme 4.

Example 5

In a nitrogen-filled drybox, neat DIBAL-H (1.00 mL, 5.61 mmol, d=0.798) and 1,3-divinylcyclopentane solution (30.9 wt % in toluene, 1.11 g, 2.81 mmol) are mixed in a capped scintillation vial with a stir-bar. This mixture is heated to and held at 90° C. with stirring for 18 hours. The reaction proceeds as intended (see non-limiting Reaction Scheme 5) to form the dual-headed organoaluminum composition. To confirm the reaction, an aliquot of the mixture is diluted with C₆D₆, hydrolyzed with 10 wt % NaOD in D₂O, and analyzed by ¹H NMR and ¹³C NMR. ¹H NMR and ¹³C NMR show the expected hydrolysis product 1,3-bis(ethyl-2-d)cyclopentane of the dual-headed organoaluminum composition. The hydrolyzed sample is also analyzed by GC/MS, which shows a clean peak with m/z of 128 that is consistent with the expected hydrolyzed product of the dual-headed organoaluminum composition.

Reaction Scheme 5.

What is claimed is:
1. A composition of formula (I):

wherein:

n is a number from 1 to 100;

each J group is independently hydrogen or a substituted or unsubstituted acyclic alkyl group;

two J groups attached to the same Al atom can be optionally covalently linked together;

and Y is a linking group comprising two points of attachment to Al atoms and is selected from the group consisting of the following formulas (II) to (V):

$$—CH_2CH_2(CHR_1)_mCH_2CH_2— \quad (II),$$

(III), (IV), (V), wherein:

$R_1$ is hydrogen or a $C_1$ to $C_{20}$ alkyl or aryl group; and m is a number from 0 to 20.

2. The composition of claim 1, wherein each J is hydrogen or a $C_1$ to $C_{20}$ acyclic alkyl group.

3. The composition of claim 1, wherein n is a number from 1 to 10.

4. The composition of claim 1, wherein n is a number from 1 to 3.

5. A process for preparing an organoaluminum composition, the process comprising:
(a) combining an aluminum compound, a linking agent, and an optional solvent at a temperature of from 25° C. to 200° C., and
(b) obtaining the organoaluminum composition, wherein:
the aluminum compound has the formula $Al(J)_3$, wherein each J group is independently hydrogen or a substituted or unsubstituted acyclic alkyl group, and, optionally, two J groups can be covalently linked together; and the linking agent is 1,2,4-trivinylcyclohexane or 1,3-divinylcyclopentane.

6. An organoaluminum composition comprising the reaction product of: an aluminum compound, a linking agent, and an optional solvent, wherein:
the aluminum compound has the formula $Al(J)_3$, wherein each J group is independently hydrogen or a substituted or unsubstituted acyclic alkyl group, and, optionally, two J groups attached to the same Al atom can be covalently linked together; and
the linking agent is 1,2,4-trivinylcyclohexane or 1,3-divinylcyclopentane.

7. A polymerization process for preparing a polymer composition, the process comprising: (a) contacting at least one olefin monomer with a catalyst composition, wherein the catalyst composition comprises the reaction product of at least one catalyst precursor, at least one co-catalyst, and the composition of claim 1, and (b) obtaining the polymer composition.

8. A polymer composition prepared by the process of claim 7, wherein the polymer composition comprises one or two aluminum termini.

9. A process for preparing a polymer or a polymer mixture by converting polymer-Al bonds of the polymer composition of claim 8 using either chemical reagent or high temperature.

* * * * *